United States Patent
Nakanowatari et al.

(10) Patent No.: US 7,611,053 B2
(45) Date of Patent: Nov. 3, 2009

(54) TICKET ISSUING SYSTEM, STORAGE MEDIUM AND ELECTRONIC TICKET ISSUING AND MANAGING METHOD

(75) Inventors: Takanori Nakanowatari, Tokyo (JP); Mitsuhisa Kamei, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 45 days.

(21) Appl. No.: 11/515,453

(22) Filed: Sep. 1, 2006

(65) Prior Publication Data

US 2007/0185982 A1 Aug. 9, 2007

(30) Foreign Application Priority Data

Feb. 3, 2006 (JP) ............... 2006-027044

(51) Int. Cl.
*G06F 7/08* (2006.01)
(52) U.S. Cl. .............. 235/381; 235/375; 235/486; 235/487; 235/382; 705/1; 705/65
(58) Field of Classification Search ............... 235/381, 235/382, 375, 487, 486; 705/65, 66, 50, 705/1

See application file for complete search history.

(56) References Cited

U.S. PATENT DOCUMENTS

| | | | |
|---|---|---|---|
| 6,216,227 B1* | 4/2001 | Goldstein et al. | 713/172 |
| 6,690,794 B1* | 2/2004 | Terao et al. | 380/22 |
| 7,004,388 B2* | 2/2006 | Kohta | 235/381 |
| 7,392,226 B1* | 6/2008 | Sasaki et al. | 705/64 |
| 2002/0077983 A1* | 6/2002 | Tagashira | 705/50 |
| 2002/0116343 A1* | 8/2002 | Nakamura et al. | 705/65 |
| 2004/0039911 A1 | 2/2004 | Oka et al. | |
| 2004/0039919 A1* | 2/2004 | Takayama et al. | 713/180 |
| 2004/0059685 A1* | 3/2004 | Sakamura et al. | 705/65 |
| 2004/0187009 A1* | 9/2004 | Ebata | 713/185 |
| 2004/0193546 A1 | 9/2004 | Tokutani et al. | |
| 2005/0049975 A1* | 3/2005 | Katayama | 705/64 |
| 2006/0161446 A1* | 7/2006 | Fyfe et al. | 705/1 |
| 2006/0188097 A1* | 8/2006 | Taniguchi et al. | 380/201 |
| 2006/0288424 A1* | 12/2006 | Saito | 726/26 |
| 2007/0017979 A1* | 1/2007 | Wu et al. | 235/382 |

(Continued)

FOREIGN PATENT DOCUMENTS

JP 03027924 8/2002

(Continued)

OTHER PUBLICATIONS

Office Action relating to corresponding Korean Patent Application No. 10-2006-0097125 (5 pages) with English Translation (5 pages).

*Primary Examiner*—Edwyn Labaze
(74) *Attorney, Agent, or Firm*—Gauthier & Connors LLP

(57) ABSTRACT

There is provided a ticket issuing system issuing an electronic ticket for digital content to a user system attempting to utilize the digital content by means of the electronic ticket. The ticket issuing system includes a receiver that receives a request to issue the electronic ticket for the digital content from the user system attempting to utilize the digital content using the electronic ticket, and an issuance controller that controls issuance of the electronic ticket for the digital content to the user system, on the basis of a retained electronic ticket in the user system.

22 Claims, 13 Drawing Sheets

U.S. PATENT DOCUMENTS

2007/0044157 A1* 2/2007 Taguchi et al. ................. 726/27

FOREIGN PATENT DOCUMENTS

| | | |
|---|---|---|
| JP | 2003-157334 | 3/2003 |
| JP | 2002008291 | 5/2003 |
| JP | 2003196414 | 7/2003 |
| JP | 2004-302931 | 10/2004 |
| KR | 20010067759 | 7/2001 |

* cited by examiner

| CONTENT ID | NECESSARY TICKET ID |
|---|---|
| C001 | T001 |
| C001 | T002 |
| C002 | T001 |
| C002 | T002 |
| C002 | T003 |
| C003 | T002 |
| ⋮ | ⋮ |

Fig. 2

| USER ID | TICKET ID | ISSUING DATE AND TIME |
|---|---|---|
| U001 | T001 | 2005-12-20T11:21:02+09:00 |
| U005 | T003 | 2005-12-20T11:28:10+09:00 |
| U002 | T001 | 2005-12-20T12:03:08+09:00 |
| U001 | T010 | 2005-12-20T12:43:20+09:00 |
| ⋮ | ⋮ | ⋮ |

Fig. 5

| CONTENT ID | NECESSARY TICKET ID | RIGHTS TO BE GRANTED |
|---|---|---|
| C001 | T001 | R, W |
| C001 | T002 | R |
| C002 | T001 | R |
| C002 | T002 | R |
| C002 | T003 | R, W |
| C003 | T002 | R, W |
| ⋮ | ⋮ | ⋮ |

Fig. 7

| CONTENT ID | CORRESPONDING TICKET ID | ISSUANCE REQUIREMENTS | RIGHTS TO BE GRANTED |
|---|---|---|---|
| C009 | T002 | BEING USED ONE OR MORE TIMES | THREE-TIME USE |
| C009 | T008 | BEING USED THREE OR MORE TIMES | FIVE-TIME USE |
| C010 | T001 | BEING USED ONE OR MORE TIMES | THREE-TIME USE |
| C010 | T003 | BEING USED TWO OR MORE TIMES | FIVE-TIME USE |
| C010 | T009 | BEING USED ONE OR MORE TIMES | FIVE-TIME USE |
| ... | ... | ... | ... |

Fig. 8

| CONTENT ID | CORRESPONDING TICKET ID | ISSUANCE REQUIREMENTS | RIGHTS TO BE GRANTED |
|---|---|---|---|
| C010 | NONE | NONE | R |
| C010 | T001-T009 | POSSESSION OF ONE OR MORE ITEMS | R, W |
| ... | ... | ... | ... |

Fig. 9

| CONTENT ID | CORRESPONDING TICKET ID | ISSUANCE REQUIREMENTS | RIGHTS TO BE GRANTED |
|---|---|---|---|
| C010 | NONE | NONE | ONE-TIME USE |
| C010 | T001-T009 | POSSESSION OF ONE TO THREE ITEMS | THREE-TIME USE |
| C010 | T001-T009 | POSSESSION OF FOUR TO NINE ITEMS | TEN-TIME USE |
| ... | ... | ... | ... |

Fig. 10

| CONTENT ID | CORRESPONDING TICKET ID | ISSUANCE REQUIREMENTS |
|---|---|---|
| C010 | T001 | REQUESTED WITHIN 3 MONTHS FROM ISSUING DATE |
| C010 | T002 | REQUESTED WITHIN 2 MONTHS FROM ISSUING DATE |
| ... | ... | ... |

Fig. 11

| CONTENT ID | CORRESPONDING TICKET ID | RIGHTS TO BE GRANTED |
|---|---|---|
| C010 | T001 | PERMISSION FOR PRELIMINARY ISSUANCE |
| C010 | T002 | PERMISSION FOR PRELIMINARY ISSUANCE |
| ... | ... | ... |

Fig. 12

TICKET ISSUING SYSTEM, STORAGE MEDIUM AND ELECTRONIC TICKET ISSUING AND MANAGING METHOD

BACKGROUND

1. Technical Field

The present invention relates to technology for protecting rights to digital content, and more particularly to a technique for issuing and managing electronic tickets.

2. Related Art

In recent years, various types of digital content, such as image data, video data, document data, music data, and game and other programs, have been supplied from a variety of content providers to users. When such digital content is supplied, a digital right management (DRM) technology is employed for protecting rights, such as a copyright and the like, of a content provider.

A typical application example of a DRM technology is a system using electronic tickets. In this system, digital content is distributed to users in a state where usage restrictions on the digital content are defined by means of an encryption technique. Defining these types of usage restrictions is also referred to as "encapsulation." In order to utilize encapsulated digital content (hereinafter simply referred to as a "capsule"), a user should separately obtain an electronic ticket which contains information such as a key necessary for removing the usage restrictions. An electronic ticket is sometimes referred to as a license.

As one electronic ticket issuing and managing scheme, there has been known a system using an access control list. In this system, a usage condition for an individual content item is previously registered for each user in the access control list. When an electronic ticket for a content item is requested from a user, a usage condition for the content item having been specified to the user is obtained in the access control list, and an electronic ticket matching the obtained usage condition is issued.

SUMMARY

According to an aspect of the present invention, there is provided a ticket issuing system issuing an electronic ticket for digital content to a user system attempting to utilize the digital content by means of the electronic ticket. The ticket issuing system includes a receiver that receives a request to issue the electronic ticket for the digital content from the user system attempting to utilize the digital content using the electronic ticket, and an issuance controller that controls issuance of the electronic ticket for the digital content to the user system, on the basis of a retained electronic ticket in the user system.

BRIEF DESCRIPTION OF THE DRAWINGS

Exemplary embodiments of the present invention will be described in detail by reference to the following figures, wherein:

FIG. 2 is a diagram for explaining an example of an issuing rule;

FIG. 5 shows an example of history information managed by an issuance history managing section;

FIG. 7 is a diagram for explaining another example of the issuing rule;

FIG. 8 is a diagram for explaining a further example of the issuing rule;

FIG. 9 is a diagram for explaining a still further example of the issuing rule;

FIG. 10 is a diagram for explaining yet another example of the issuing rule;

FIG. 11 is a diagram for explaining a yet further example of the issuing rule;

FIG. 12 is a diagram for explaining another example of the issuing rule; and

DETAILED DESCRIPTION

Figure 1:
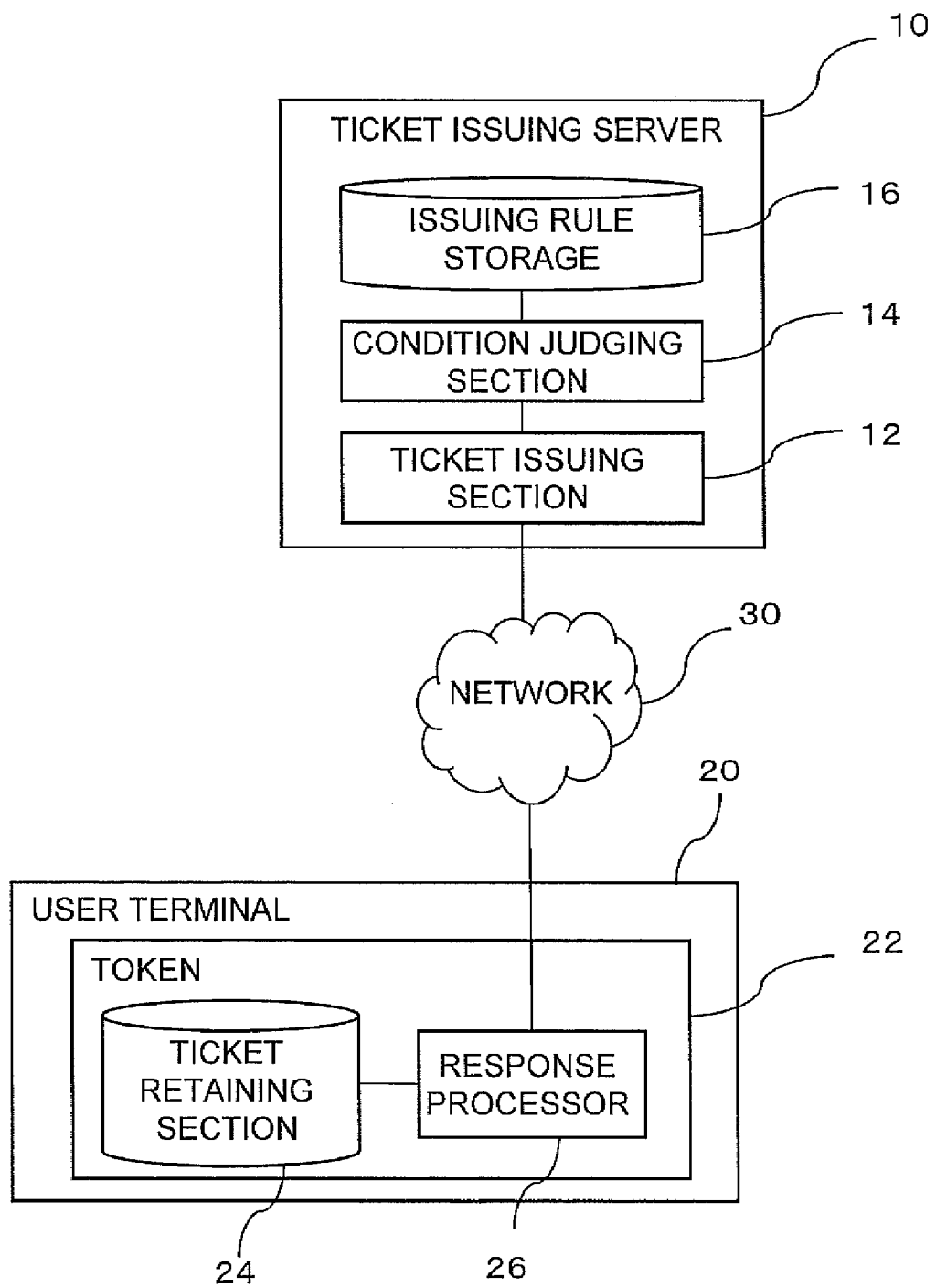
FIG. 1 shows an example configuration of a system according to an exemplary embodiment of the present invention.

By reference to FIG. 1, an example of a system according to an exemplary embodiment of the present invention will be described below. In the system, a ticket issuing server 10 and a user terminal 20 such as a personal computer are connected on a network 30, such as a local area network (LAN) or the Internet.

The ticket issuing server 10 issues an electronic ticket in response to a request from the user terminal 20. The electronic ticket is data containing information of a key used for removing usage restrictions defined on digital content supplied from a content providing server (not illustrated in FIG. 1) existing on the network 30 to the user terminal 20, and is sometimes referred to as license information. When digital content is encapsulated by means of a technique such as an encryption technique, the electronic ticket includes a key used for decoding the encapsulated digital content, or includes information necessary for generating the key. In addition, the electronic ticket may include information on a usage condition for digital content. As the usage condition for digital content, for example, it is possible to specify permission to perform operation on the digital content (such as "browse only permission," "browse and write permission," or the like) given to a user, the number of times use of the digital content is allowed for the electronic ticket, an expiration date of the electronic ticket, and the like. A combination of these items may be, of course, specified as the usage condition.

The ticket issuing server 10 includes a ticket issuing section 12, a condition judging section 14, and an issuing rule storage 16. Upon receipt of a request to issue an electronic ticket from the user terminal 20, the ticket issuing section 12 determines whether or not the electronic ticket should be issued in response to the request. When issuance of the electronic ticket is determined, the electronic ticket is issued to the user terminal 20 being a sender of the request for the electronic ticket. On the other hand, when the issuance of the electronic ticket is not determined, predetermined error information indicating disabled issuance of the electronic ticket is returned to the user terminal 20.

In a system for selling digital content or electronic tickets, determination as to whether or not the electronic ticket is issued in response to a request is conducted on the basis of whether or not a user who operates the user terminal 20 has paid a cost for using the digital content, for example. Meanwhile, there may be a system for supplying digital content to pre-registered limited users in accordance with respective rights of the users as in the case of distributing internal business documents to the users in a company. In this case, on the basis of information of user rights registered in an access control list (ACL), a determination is made as to whether or not an electronic ticket being a target of a request is issued to a user who is a source of the request, or as to which usage condition is specified on the electronic ticket to be issued. As an alternative to such a conventional determination method, or as an additional determination method, a method is adopted in this exemplary embodiment in which information of an electronic ticket possessed by a user who is a request source is used as information which constitutes a basis for determination. The issuing rule storage 16 stores one or more issuing rules. The issuing rule is a rule for determining whether or not issuance of an electronic ticket requested by a user is enabled, or determining at least one usage condition for an electronic ticket to be issued. In the issuing rule, the information of the electronic ticket possessed by the user is used as the information constituting a basis for determination. On the basis of the issuing rule, the condition judging section 14 forms either a judgment on enabling/disabling of issuance of an electronic ticket or a judgment on details of the usage condition, or forms both of the judgments.

As an example, FIG. 2 shows an issuing rule stored in the issuing rule storage 16. According to this example, in connection with identification information of a content item whose use is requested from a user (a content ID), there is registered identification information of an electronic ticket which ought to be possessed by a user at the time of issuance of a new electronic ticket necessary for using the requested content item (a necessary ticket ID). The issuing rule shown in FIG. 2 is a rule for enabling/disabling issuance of an electronic ticket. According to the rule shown in FIG. 2, in order to obtain an electronic ticket for a content item having a content ID "C001," for example, a user being a request source must retain in the user terminal 20 an electronic ticket having a ticket ID of "T001" or "T002."

In the system shown in FIG. 1, upon receipt of a request to issue an electronic ticket from the user terminal 20, the ticket issuing section 12 sends to the user terminal 20 a query as to information on retained electronic tickets in the user terminal 20. Then, the ticket issuing section 12 passes a reply to the query obtained from the user terminal 20 to the condition judging section 14, and causes the condition judging section 14 to determine whether or not issuance of the requested electronic ticket is enabled.

The user terminal 20 may be a computer, such as a personal computer, a workstation, or the like, having an operating system and various applications installed therein. Such applications installed in the computer include an application for using the digital content supplied from the content providing server.

In addition, the user terminal 20 further includes a token 22 for managing electronic tickets. The token 22 manages the electronic tickets received from the ticket issuing server 10 and performs, when use of digital content is required from a user, a process for determining whether or not the use of digital content is allowed (or determining under which usage condition the use of digital content is allowed). The token 22 is configured so as to be protected against tampering, and may be implemented as either software or hardware. The token 22 includes a ticket retaining section 24 in which the electronic tickets received from the ticket issuing server 10 are stored, and a response processor 26 which returns information of the electronic tickets stored in the ticket retaining section 24 in response to a query from the ticket issuing section 12.

When an access ticket scheme disclosed in Japanese Patent Laid-Open Publication Nos. Hei 10-247905 or Hei 11-031105 filed by the present applicant is adopted in a system using an electronic ticket, the token 22 retains information on an individual key allocated for each user terminal. The user terminal 20 utilizes, in combination, information contained in the electronic ticket and information of the individual key contained in the token to decode a content encryption key corresponding to an encapsulated content item, and further decodes the encapsulated content item by means of the content encryption key. In this system, a token ID of the token 22 in the user terminal 20 and the information of the individual key are previously registered in the ticket issuing server 10. The ticket issuing server 10 uses the information to issue an appropriate ticket corresponding to the token 22 of the user terminal 20.

By reference to FIG. 3, procedural steps for issuing an electronic ticket performed in the system of FIG. 1 will be described below.

In the procedural steps, the user terminal 20 requests issuance of an electronic ticket from the ticket issuing server 10 (S11). Here, the user terminal 20 sends to the ticket issuing server 10 a request including a content ID of digital content that the user wishes to use. Alternatively, in a case where the user accesses a content providing server (which may be configured as a web server, for example) to download desired digital content to the user terminal 20, a request to issue an electronic ticket corresponding to the desired digital content may be sent from the content providing server to the ticket issuing server 10 (in this case, the request includes information for identifying the user terminal 20).

Upon receipt of the request to issue the electronic ticket, the ticket issuing server 10 refers to the issuing rule storage 16 to find a necessary ticket ID corresponding to the content ID of the desired digital content being a target of the request (S21). Then, the ticket issuing server 10 inquires the user terminal 20 as to whether the user terminal 20 retains an electronic ticket corresponding to the necessary ticket ID (S22).

According to the issuing rule shown in FIG. 2, for example, if target digital content has a content ID of "C002," the necessary ticket ID is "T001," "T002," or "T003." Therefore, the ticket issuing server 10 sends to the user terminal 20 a query as to the presence or absence of an electronic ticket corresponding to any one of the three necessary ticket IDs retained in the user terminal 20.

In the user terminal 20 having received the query, the response processor 26 in the token 22 searches the ticket retaining section 24 to find the presence or absence of the retained electronic ticket corresponding to each necessary ticket ID (S12), and returns to the ticket issuing server 10 a reply including a searched result for each necessary ticket ID (i.e. the "presence" or "absence" of the electronic ticket) (S13).

Upon receipt of the reply, the ticket issuing server 10 performs matching for the reply on the issuing rule, to determine whether or not a condition for issuing the electronic ticket for the digital content in question is satisfied (S23). When the digital content in question is "C002," for example, issuance of the electronic ticket for the digital content is determined to be enabled upon receipt of a reply representing possession of at least one of "T001," "T002," and "T003" from the user terminal 20.

Then, the ticket issuing server 10 checks a result of determination in step S23 (S24). When the result of determination indicates that the issuance is to be disabled, the ticket issuing server 14 returns to the user terminal 20 a reply indicating that the issuance is disabled (S25). Upon receipt of the reply, the user terminal 20 performs a predetermined error handling process, such as a process of displaying on a screen a message that the electronic ticket is unavailable (S14). On the other hand, when the result of determination indicates that the issuance is to be enabled, the ticket issuing server 10 generates an electronic ticket corresponding to the digital content in question and transmits the generated electronic ticket to the user terminal 20 (S26). Upon receipt of the electronic ticket, the token 22 in the user terminal 20 registers the received electronic ticket in the ticket retaining section 24 (S15).

In the above-described configuration of the system shown in FIG. 1, the ticket issuing server 10 sends to the user terminal 20 which is a request source a query about the retained electronic ticket in the user terminal 20. However, the system is not limited to the configuration. Here, another example of the configuration of the system will be described by reference to FIGS. 4 to 6. It should be noted that components identical or similar to those shown in FIGS. 1 and 3 are identified by the same reference numerals, and repeated descriptions thereof are omitted.

Figure 4:
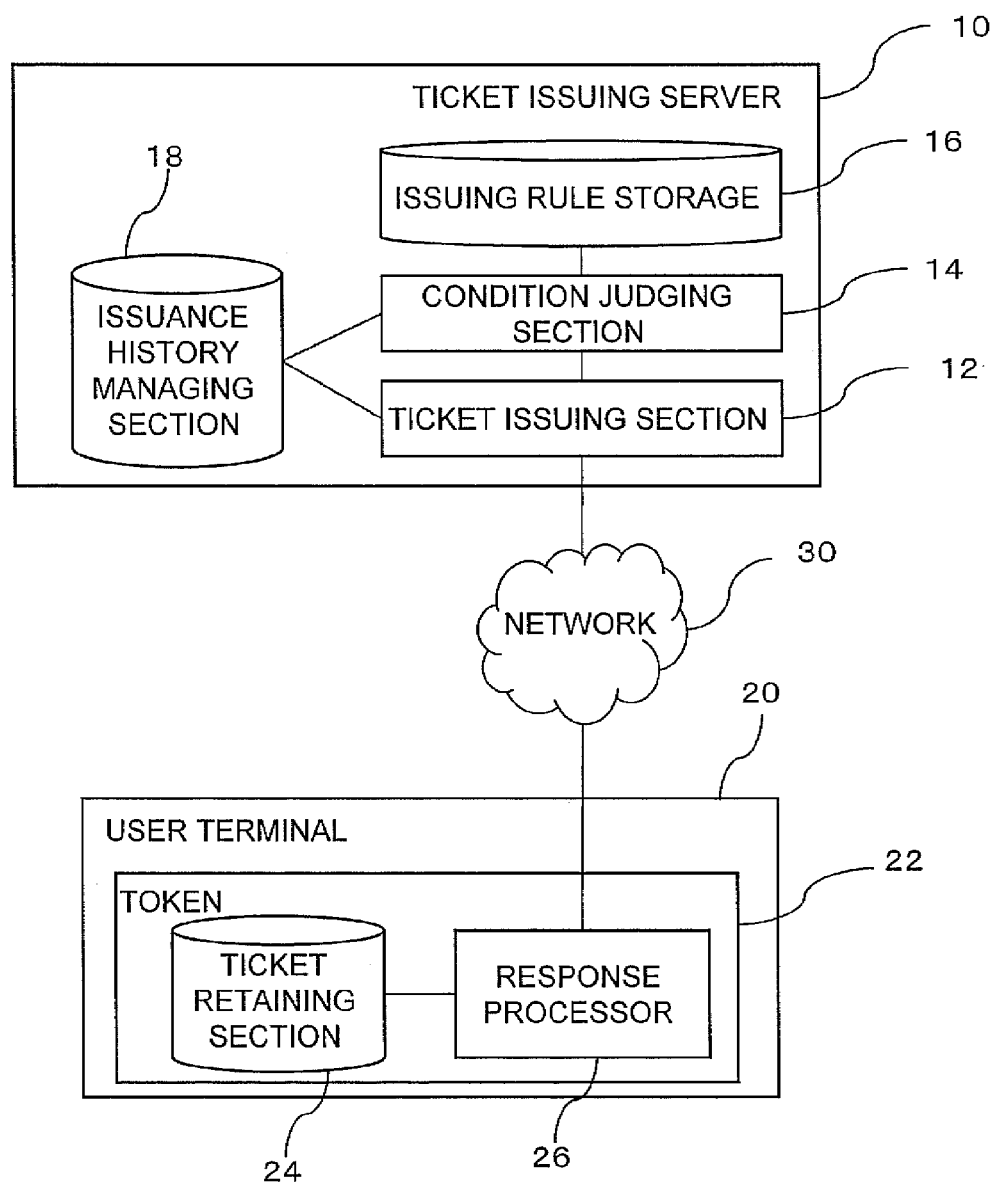
FIG. 4 shows a modified example of the configuration of the system.

In the system configuration shown in FIG. 4, the ticket issuing server 10 has an issuance history managing section 18 installed therein. The issuance history managing section 18 stores a history of the electronic ticket issued to each user from the ticket issuing server 10.

FIG. 5 shows an example of data managed in the issuance history managing section 18. In this example, the issuance history managing section 18 stores, in association with a user ID being identification information of a user, a ticket ID of an electronic ticket issued to the user and an issuing date and time of the electronic ticket. Alternatively, identification information of the user terminal 20 or that of the token 22 may be used instead of the user ID. In addition to the issuing date and time, there may be recorded information on usage conditions, such as an expiration date of the electronic ticket, an upper limit to the number of times use of the electronic ticket is allowed, operation rights to digital content, and the like.

Figure 6:
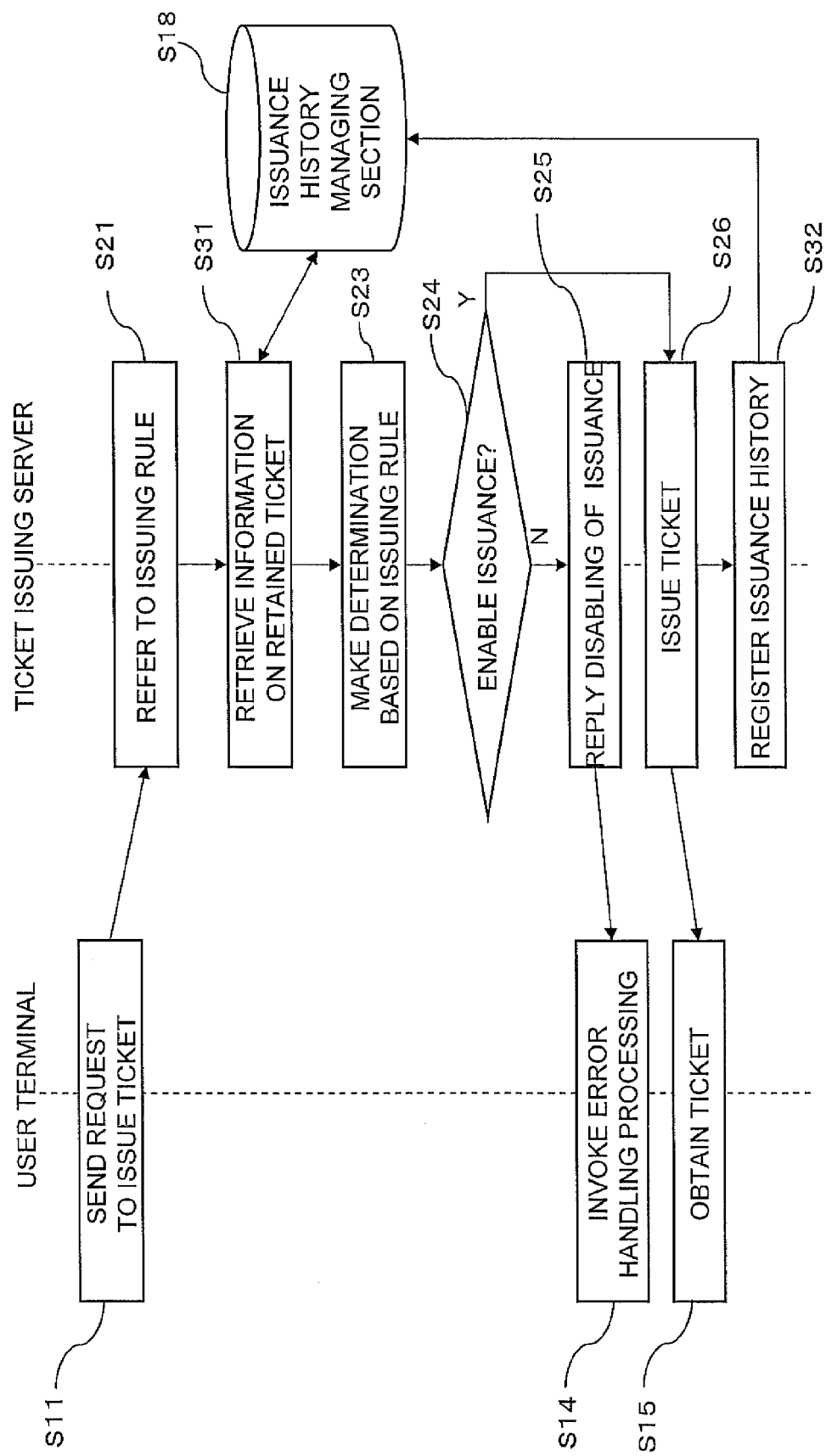
FIG. 6 is a flowchart showing an example of process steps performed in the system according to the modified example.

By reference to FIG. 6, procedural steps performed in the system of FIG. 4 will be described below. In the procedural steps, when the user terminal makes a request to issue an electronic ticket, the ticket issuing server 10 refers to the issuing rules to find a necessary ticket ID (S21), and searches the issuance history managing section 18 to determine whether or not the user terminal 20 being a request source retains the necessary ticket ID (S31). Because the issuance history managing section 18 stores histories of electronic tickets issued to each user terminal 20, the histories can be used to determine whether or not the user terminal 20 being the request source has an electronic ticket corresponding to each necessary ticket ID. Next, the ticket issuing server 10 performs matching for the searched result in step S31 on the issuing rule to determine whether or not issuance of the requested electronic ticket is to be enabled for the user terminal 20 being the request source (S23, S24). When the electronic ticket is issued, an issuance history of the electronic ticket (information, such as a user ID of an issuance destination, the issued ticket ID, or the like) is stored in the issuance history managing section 18 (S32).

Although in the example of FIG. 4 the issuance history managing section 18 is provided in the ticket issuing server 10, instead of the issuance history managing section 18, a server having the function of the issuance history managing section 18 may be provided on the network 30. In this case, in addition to sending to the server a query as to the presence or absence of the electronic ticket corresponding to the necessary ticket ID, the ticket issuing server 10 registers information of a issuance history of an electronic ticket in the server when the electronic ticket is issued.

The issuing rule (refer to FIG. 2) used in the above-described example is presented merely for the purpose of illustration. For example, in the example of FIG. 2 multiple necessary ticket IDs are described as an OR condition for one content ID. Instead of or in addition to the OR condition, a rule in which the multiple necessary ticket IDs are combined under an AND condition may be registered. In this case, it is possible to describe a condition that issuance of the electronic ticket corresponding to the digital content "C010" is enabled when both of the tickets "T002" and "T003" are present in the user terminal 20, for example. Alternatively, the issuing rule may be described by means of a general Boolean expression. For example, a condition that issuance of the ticket corresponding to the digital content "C010" is enabled when both of the ticket "T002" and "T003" exist, yet the ticket "T004" does not exist in the user terminal 20, and other conditions may be described.

As another example of the issuing rule, a rule as depicted in FIG. 7 may be adopted. In this example, in addition to pairs of the content ID and the necessary ticket ID similar to those of FIG. 2, rights to be granted to the user terminal 20 upon matching to the pairs are registered in the issuing rule. According to the issuing rule shown in FIG. 7, in a case of issuing an electronic ticket corresponding to the digital content "C001," for example, when the user terminal 20 has only the ticket "T001," an electronic ticket indicating read (R) and write (W) operation rights is issued. In the case of issuing the electronic ticket corresponding to the same digital content "C001," however, when the user terminal 20 has only the ticket "T002," an operation right specified to the electronic ticket to be issued is only the R operation right. In addition, when the user terminal 20 has both "T001" and "T002," for example, one of the operation rights which is more advantageous for the user may be applied.

Although in FIG. 7 the operation rights to the digital content are used as an example of the "rights to be granted," the rights to be granted are not limited to those described in FIG. 7. For example, a term of validity of the electronic ticket to be issued, the upper limit of the number of times the electronic ticket can be used, or the like may be defined.

A still further example of the issuing rule as depicted in FIG. 8 may be used. In this example, in association with the pairs of the "content ID" and the "corresponding ticket ID," there is registered "issuance requirements" and "rights to be granted." More specifically, in response to a request to issue an electronic ticket for a content item identified with the "content ID," an electronic ticket representing a usage condition shown in the "rights to be granted" is issued upon satisfaction of both the condition that the user terminal 20 being a source of the request has an electronic ticket having the "corresponding ticket ID" and the condition that a usage state of the electronic ticket having the "corresponding ticket ID" matches the "issuance requirement." According to the issuing rule shown in FIG. 8, for example, when the user terminal 20 requesting the electronic ticket corresponding to the content "C009" does not have the ticket identified with "T002" but has an electronic ticket identified with "T008," and the electronic ticket identified with "T008" is used three or more times by the user terminal 20, an electronic ticket for permitting use of the content item "C009" five times is issued.

Figure 3:
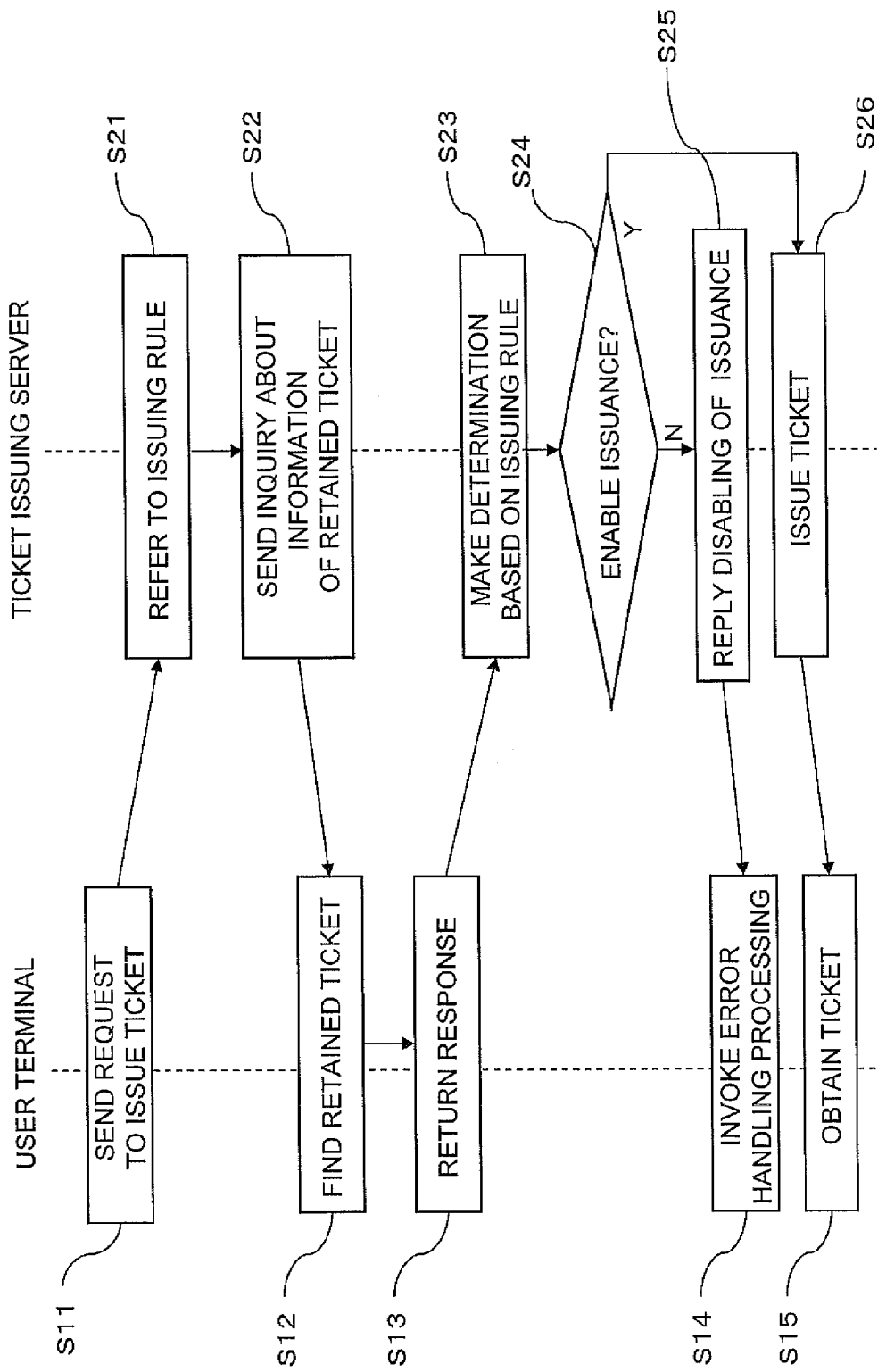
FIG. 3 is a flowchart showing an example of process steps performed in the system according to the exemplary embodiment.

In order to implement such an issuing rule in the system configured as shown in FIG. 1, upon receipt of a query from the ticket issuing server 10 in step S22 of FIG. 3, the user terminal 20 additionally returns information regarding the number of times the retaining electronic ticket has been used (S13). The token 22 records the number of times each retaining electronic ticket is used. On the other hand, in the system configured as shown in FIG. 4, information regarding the use of an electronic ticket (for example, a ticket ID for a used electronic ticket) may be registered in the issuance history managing section 18 every time the user terminal 20 uses the electronic ticket. In this manner, the number of times the electronic ticket is used can be known by inquiring the issuance history managing section 18.

As still another example of the issuing rule, a rule depicted in FIG. 9 may be used. In this example, electronic tickets representing different "rights to be granted" are issued depending on whether or not the user terminal 20 retains a ticket having the "corresponding ticket ID" associated with the "content ID" of a target content item. More specifically, in the example of FIG. 9, when an electronic ticket for a content item having a content ID "C010" is requested, the ticket issuing server 10 issues an electronic ticket for permitting R and W operation rights to the content item "C010" when the user terminal 20 being a source of the request retains one or more of nine tickets identified with the ticket IDs "T001" to "T009." On the other hand, when the user terminal 20 has none of the nine tickets, the ticket issuing server 10 issues an electronic ticket for permitting only an R operation right to the content item "C010."

As described above, even when the user terminal 20 does not retain a ticket having the corresponding ticket ID, an electronic ticket for permitting a predetermined right may be issued. In this case, it is preferable that when the ticket having the corresponding ticket ID is retained, there is issued an electronic ticket representing an advantageous right relative to that granted in a case where the ticket having the corresponding ticket ID is not retained.

The issuing rule as shown in FIG. 9 may be effectively employed to issue an electronic ticket necessary for using a series of content items, such as content items of quarterly or weekly publication. More specifically, when the user terminal 20 retains a ticket for a content item in the series, an electronic ticket for permitting an advantageous right relative to that permitted when the ticket is not retained may be issued according to the issuing rule.

Further, as shown in FIG. 10, it is also possible that the "issuance requirements" are changed in various manners among pairs of the same "content ID" and different "corresponding ticket Ids," thereby changing the "rights to be granted" for each of the "issuance requirements." Regarding issuance of an electronic ticket for the same content "C010" in the example of FIG. 10, an electronic ticket for permitting three-time use of the content may be issued when the user terminal 20 retains one to three of the electronic tickets of "T001 to T009," whereas an electronic ticket for permitting ten-time use of the content may be issued when the user terminal 20 has four to nine of these electronic tickets.

As yet a further example of the issuing rule, a rule as shown in FIG. 11 may be used. In this example, a time period over which the user terminal 20 has been retaining the electronic ticket identified with the "corresponding ticket ID" is taken into account as an "issuance requirement." According to this issuing rule, for example, upon receipt of a request to issue an electronic ticket for a content item of "C010" from the user terminal 20, issuance of the electronic ticket for the content item "C010" is enabled upon satisfaction of both the condition that the user terminal 20 retains the ticket identified with "T001" and the condition that the request is made within three months from the issuing date of the ticket "T001." In this case, when the request is not made within three months from the issuing date, issuance of the electronic ticket for the content item "C010" is disabled even though the terminal 20 retains the ticket "T001."

Further, the issuing rule shown in FIG. 12 is a rule to control preliminary issuance of an electronic ticket for using digital content on the basis of another electronic ticket retained in the user terminal 20. The term "preliminary issuance" refers to issuing an electronic ticket in a predetermined time period prior to a usual issuance starting date of the electronic ticket. In the example of FIG. 12, when the electronic ticket identified with "T001" or "T002" is retained in the user terminal 20 being a request source, the preliminary issuance of the electronic ticket for a content item of "C010" is enabled. In this case, the ticket issuing server 10 issues the electronic ticket for the requested content item "C010" as long as the request from the user terminal 20 is made within or after the time period of the preliminary issuance. Through adoption of such an issuing rule, preliminary issuance of an electronic ticket for digital content is enabled for a user who possesses a particular electronic ticket associated with that electronic ticket for the digital content.

According to the above-described exemplary embodiments and modified examples, on the basis of the retained electronic ticket in the user terminal 20, the ticket issuing server 10 determines whether or not a new electronic ticket is issued, or determines details of a right (the usage condition) allocated to the new electronic ticket to be issued. Because issuance of the new electronic ticket is controlled in accordance with circumstances where the user obtains or utilizes the retained electronic ticket as described above, for example, a value-added service can be offered to a user who is a regular user; i.e. a scheme to enable provision of a service which can yield an increase in level of customer satisfaction can be provided.

Further, such control of issuance of a new electronic ticket based on information of the retained electronic ticket in the user terminal 20 as described above advantageously realizes control of the issuance of a new electronic ticket in accordance with the retained electronic ticket in the user terminal 20 existing at the time of issuing, a usage state of the retained electronic ticket, and other circumstances; i.e., dynamic circumstances surrounding a user. Such ticket issuing control in accordance with the dynamic circumstances cannot be implemented in conventional control of ticket issuance using the access control list, because the access control list cannot be updated unless a manager rewrites data in the access control list.

In the above-described exemplary embodiments and modified examples, it is also preferable that electronic tickets having the same ticket ID be issued for every user, as long as the requested target is the same content item. If rights to be granted vary from one user to another with respect to even the same content item, rights to be specified on the electronic tickets accordingly differ depending on the users. In this example, however, the same ticket ID may be assigned to the electronic tickets representing the different rights. When the ticket IDs are changed for each right specified on an electronic ticket, it is necessary to describe a great number of the "necessary ticket IDs" or "corresponding ticket IDs" in the issuing rule, which increases complexity (for example, it becomes necessary to describe multiple electronic tickets for the same content item). Such complexity can be reduced by issuing the electronic tickets having the same ticket ID when the requested target is the same content item.

Although the above-described examples have used the issuing rules in which the presence or absence of an electronic ticket, the number of times the electronic ticket is used, and an elapsed time from the issuing date of the electronic ticket are taken into consideration as information of the retained electronic ticket installed in the user terminal 20, the issuing rule is not limited to those described above, and there may be adopted an issuing rule in which information items other than those described above are taken into consideration.

Still further, although in the above-described examples issuance of a new electronic ticket is controlled on the basis of the information of the retained electronic ticket installed in the user terminal 20, information other than the information of the retained electronic ticket may be used as data representing the dynamic circumstances surrounding the user terminal 20. For example, there may be employed an issuing rule configured on the basis of information of an address of the user terminal 20 (for example, a global IP address) detected when the user terminal 20 attempts to access the ticket issuing server 10. Specifically, it is possible to use an issuing rule under which the issuance of the requested electronic ticket is enabled only when the global IP address of the user terminal 20 attempting to make an access falls within a previously registered range. The use of such an issuing rule can yield appropriate restrictions on the issuing range of electronic tickets. Further, when the user terminal 20 is a mobile terminal, for example, control can be effected such that issuance of an electronic ticket is disabled in a period during which the user terminal 20 is located outside the company.

Figure 13:
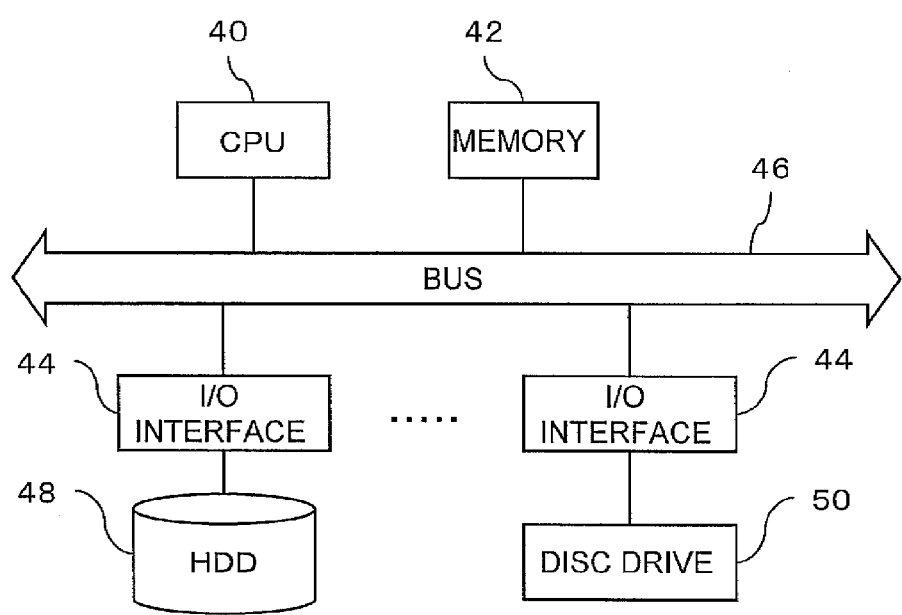
FIG. 13 shows an example hardware configuration of a computer.

The above-described ticket issuing server 10 is typically implemented by executing a program in which functions or details of processing of each component are described by means of a general-purpose computer. The computer has, as hardware, a circuit configuration in which a central processing unit (CPU) 40, a memory (a primary storage) 42, various I/O interfaces 44, and other components are connected through a bus 46 as shown in FIG. 13. In addition, a hard disc drive 48 or a disc drive 50 for reading a portable nonvolatile recording medium based on various standards, such as a CD, DVD, flash memory, or the like is connected, for example, via the I/O interface 44 to the bus 46. The drive 48 or 50 functions as an external storage in usually contrast with the memory. A program in which details of processing according to the exemplary embodiments are described is stored in a fixed storage, such as the hard disc drive 48 or the like, either via the recording medium, such as the CD or DVD, or via the network and installed into the computer. The program stored in the fixed storage is read out in the memory and executed by the CPU, to thereby realize the processing according the exemplary embodiments. In addition, the user terminal 20 may be implemented similarly by causing a general-purpose computer to execute a program in which functions or details of processing of each component are described.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with various modifications as are suited to the particular use contemplated. It is intended that the scope of the invention be defined by the following claims and their equivalents.

What is claimed is:

1. A ticket issuing system issuing an electronic ticket for digital content to a user system attempting to utilize the digital content by means of the electronic ticket, comprising:
a receiver that receives a request to issue a first electronic ticket for the digital content from the user system attempting to utilize the digital content using the first electronic ticket;
a storage that stores a correspondence relationship between the digital content and a second electronic ticket necessary for issuance of the first electronic ticket for the digital content; and
an issuance controller that controls issuance of the first electronic ticket for the digital content to the user system according to the request, and issues the first electronic ticket if the user system retains the second electronic ticket, identified by the correspondence relationship stored in the storage, necessary for issuance of the first electronic ticket for the digital content.

2. The ticket issuing system according to claim 1, further comprising:
a history storage that stores an issuance history of the first electronic ticket issued to the user system, wherein the issuance controller refers to the history storage to find the retained second electronic ticket in the user system having made the request.

3. The ticket issuing system according to claim 1, further comprising:
a register that registers, in a history managing apparatus that manages an issuance history of the first electronic ticket, information that the first electronic ticket is issued to the user system when the issuance controller issues the first electronic ticket to the user system, wherein the issuance controller inquires the history managing apparatus to find the retained second electronic ticket in the user system having made the request.

4. The ticket issuing system according to claim 1, wherein the issuance controller controls issuance of a the first electronic ticket which is a target of the request, so that the first electronic ticket is issued only when the user system having made the request retains the second electronic ticket necessary for the issuance of the first electronic ticket.

5. The ticket issuing system according to claim 1, wherein the issuance controller controls issuance of the first electronic ticket on the basis of the retained second electronic ticket and a usage history of the retained second electronic ticket in the user system having made the request.

6. The ticket issuing system according to claim 1, wherein the issuance controller controls issuance of the first electronic ticket so that the first electronic ticket is issued only when the user system having made the request retains at least a predetermined number of electronic tickets among electronic tickets associated with the digital content which is a target of the request.

7. The ticket issuing system according to claim 1, wherein the issuance controller controls issuance of the first electronic ticket which is a target of the request so that the first electronic ticket is issued only when the user system having made the request retains the second electronic ticket necessary for the issuance of the first electronic ticket and the request is made within a predetermined time period from an issuing date of the second electronic ticket.

8. The ticket issuing system according to claim 1, wherein the issuance controller controls preliminary issuance of a the first electronic ticket which is a target of the request so that the first electronic ticket is issued in advance only when the user system having made the request retains a the second ticket constituting a condition for the preliminarily issuance of the first electronic ticket.

9. The ticket issuing system according to claim 1, wherein said issuance controller controls issuance of the first electronic ticket for the digital content to the user system based upon information associated with the retained second electronic ticket in the user system and issuing rules associated with the first electronic ticket for the digital content.

10. A computer readable storage medium storing a program causing a computer to execute a process for issuing an electronic ticket, the process comprising:
   receiving a request to issue first electronic ticket for digital content from a user system attempting to utilize the digital content using the first electronic ticket;
   storing a correspondence relationship between the digital content and a second electronic ticket necessary for issuance of the fast electronic ticket for the digital content;
   controlling issuance of the first electronic ticket for the digital content to the user system according to the request; and
   issuing the first electronic ticket if the user system retains the second electronic ticket, identified by the stored correspondence relationship, necessary for issuance of the first electronic ticket for the digital content.

11. The storage medium according to claim 10, wherein the controlling issuance of the electronic ticket comprises controlling issuance of the first electronic ticket which is a target of the request so that the first electronic ticket is issued only when the user system having made the request retains the second electronic ticket necessary for the issuance of the first electronic ticket.

12. The storage medium according to claim 10, wherein the controlling issuance of the first electronic ticket comprises controlling issuance of the requested electronic ticket on the basis of a the retained second electronic ticket and a usage history of the retained second electronic ticket in the user system having made the request to issue the first electronic ticket.

13. The storage medium according to claim 10, wherein the controlling issuance of the electronic ticket comprises controlling issuance of the first electronic ticket so that the first electronic ticket is issued when the user system having made the request retains at least a predetermined number of electronic tickets among electronic tickets associated with digital content which is a target of the request.

14. The storage medium according to claim 10, wherein the controlling issuance of the first electronic ticket comprises performing control so that the first electronic ticket which is a target of the request is issued only when the user system having made the request retains the second electronic ticket necessary for issuance of the first electronic ticket and the request is made within a predetermined time period from a issuing date of the second electronic ticket.

15. The storage medium according to claim 10, wherein the controlling issuance of the first electronic ticket comprises controlling preliminary issuance of a the first electronic ticket which is a target of the request so that the first electronic ticket is issued in advance when the user system having made the request retains the second electronic ticket constituting a condition for the preliminarily issuance of the first electronic ticket.

16. The storage medium according to claim 10, the process further comprising:
   referring to an issuance history of the first electronic ticket issued to the user system having made the request to find the retained second electronic ticket in the user system.

17. The storage medium according to claim 10, the process further comprising:
   registering, in a history managing apparatus that manages an issuance history of the first electronic ticket, information that the first electronic ticket is issued to the user system at the time when the first electronic ticket is issued to the user system; and
   inquiring the history managing apparatus to find the retained second electronic ticket in the user system having made the request.

18. The computer readable storage medium according to claim 10, wherein the controlling of the issuance of the first electronic ticket for the digital content to the user system based upon information associated with the retained second electronic ticket in the user system and issuing rules associated with the first electronic ticket for the digital content.

19. An electronic ticket issuing and managing method performed in a ticket issuing system that issues an electronic ticket for digital content to a user system that attempts to utilize the digital content using the electronic ticket, comprising:
   receiving a request to issue first electronic ticket for digital content from a user system attempting to utilize the digital content using the first electronic ticket;
   storing a correspondence relationship between the digital content and a second electronic ticket necessary for issuance of the first electronic ticket for the digital content;
   controlling issuance of the first electronic ticket for the digital content to the user system according to the request; and
   issuing the first electronic ticket if the user system retains the second electronic ticket, identified by the stored correspondence relationship, necessary for issuance of the first electronic ticket for the digital content.

20. The electronic ticket issuing and managing method according to claim 19, wherein the controlling of the issuance of the first electronic ticket for the digital content to the user system based upon information associated with the retained second electronic ticket in the user system and issuing rules associated with the first electronic ticket for the digital content.

21. A computer data signal embodied in a carrier wave for enabling a computer to perform a process for issuing an electronic ticket, the process comprising:
   receiving a request to issue first electronic ticket for digital content from a user system attempting to utilize the digital content using the first electronic ticket;
   storing a correspondence relationship between the digital content and a second electronic ticket necessary for issuance of the first electronic ticket for the digital content;
   controlling issuance of the first electronic ticket for the digital content to the user system according to the request; and
   issuing the first electronic ticket if the user system retains the second electronic ticket, identified by the stored correspondence relationship, necessary for issuance of the first electronic ticket for the digital content.

22. The computer data signal embodied in a carrier wave according to claim 21, wherein the controlling of the issuance of the first electronic ticket for the digital content to the user system based upon information associated with the retained second electronic ticket in the user system and issuing rules associated with the first electronic ticket for the digital content.

* * * * *